Patented Aug. 24, 1943

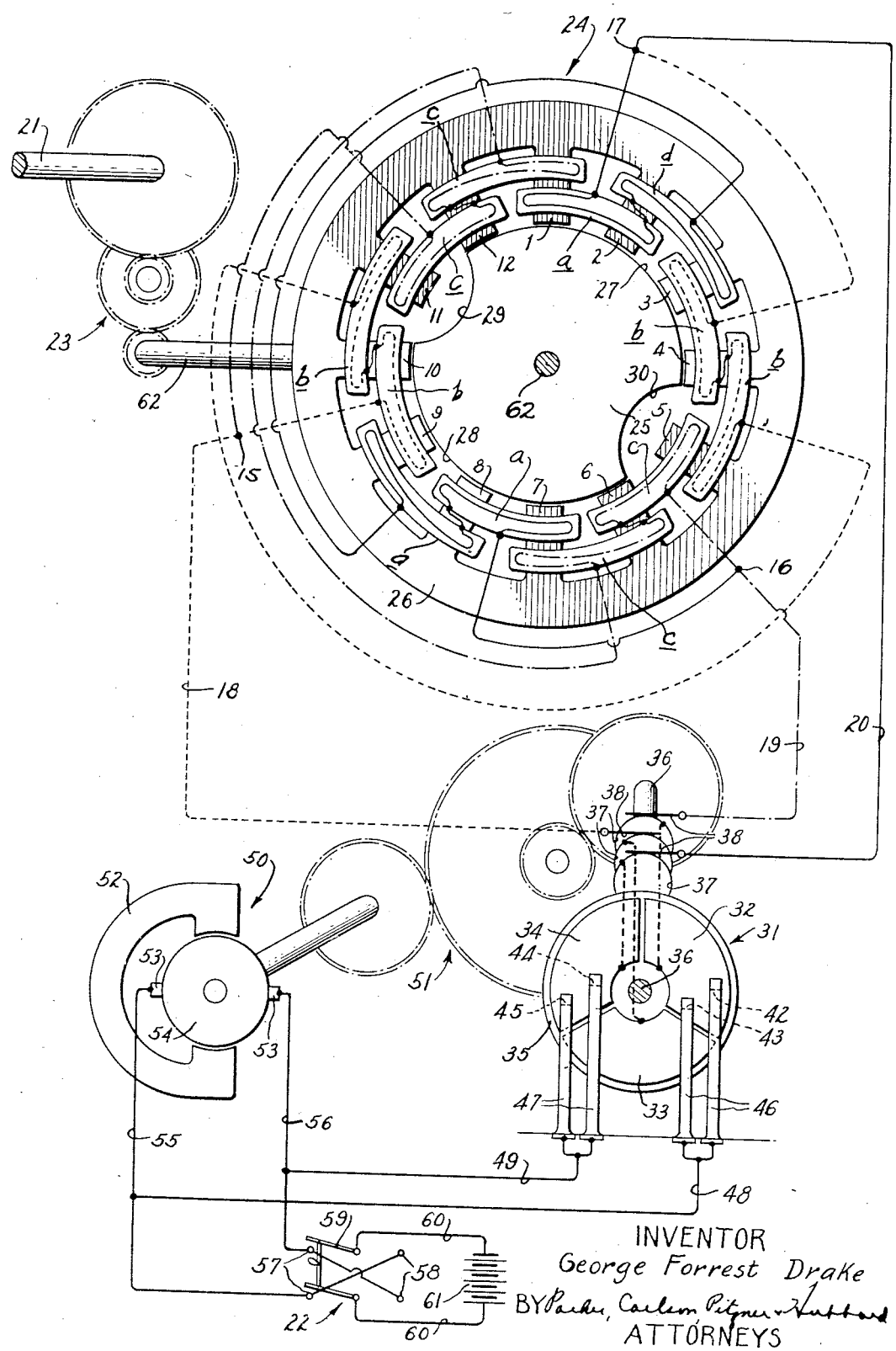

2,327,341

UNITED STATES PATENT OFFICE 2,327,341

REMOTE CONTROL SYSTEM

George Forrest Drake, Rockford, Ill., assignor to Woodward Governor Company, Rockford, Ill., a corporation of Illinois Application December 20, 1941, Serial No. 423,720

1 Claim. (Cl. 172—239)

This invention relates to an electrically driven mechanism and its control for enabling an actuated element to be positioned from a remote point of control.

The primary object is to actuate a driven element through the medium of an electric motor and provide for abrupt stopping of the element when the motor is deenergized.

Other objects and advantages of the invention will become apparent from the following detailed description taken in connection with the accompanying drawing, which is a schematic view and wiring diagram of a remote control system embodying the novel features of the present invention.

The drawing shows the invention as a means for actuating a driven element 21 under the control of a manually operable switch 22 located at a remote point. In this instance, the driven element is a shaft which may be connected to any device to be operated. It is actuated through the medium of speed reduction gearing 23 by an electric motor 24 which is especially constructed so that its rotor 25 will, when the motor is deenergized, assume a well-defined angular position and thus operate through the gearing to maintain the shaft position without the use of a brake or other holding device.

As shown, the motor comprises a stator 26 carrying twelve windings divided into three groups $a$, $b$, and $c$ and distributed over twelve stator teeth numbered consecutively from 1 to 12. The rotor is permanently magnetized and has two poles with faces 27 and 28 of such width that they overlap five of the stator teeth on diametrically opposite sides of the rotor, the two remaining teeth being disposed opposite notches 29 and 30 in the rotor periphery. Each coil encloses two adjacent stator teeth and is connected in series with a similar coil that encloses one of the same teeth and the next adjacent tooth. Thus, of the four coils $a$, one encloses poles 1 and 2, a second poles 2 and 3, the third poles 7 and 8, and the fourth poles 8 and 9. All four coils are in series as indicated by the full line representing the windings $a$ and the conductor 20 leading from one terminal thereof. The coils $b$ are similarly mounted to enclose poles 3, 4, 5 and 9, 10, 11 and connected in series as indicated by the dotted line representing the coils and the conductor 18. The coils $c$ enclose poles 5, 6, 7 and 11, 12, 1 and are connected by a conductor 19 shown by the dot-dash line. To complete a delta form of wiring, one end of the conductor 18 is connected at 17 to the conductor 20, the corresponding ends of the conductors 19 and 20 being connected to the conductors 18 and 19 respectively at 15 and 16.

By energizing the stator windings from a direct current source selectively in various polarity combinations, the rotor may be caused to assume twelve different well-defined angular positions and to turn progressively in either direction by varying the combinations properly. Such excitation is effected in the present instance by a commutator switch 31 comprising three segmental contacts 32, 33, and 34 carried on the face of an insulating disk 35 fast on a shaft 36 which carries rings 37 engaged by brushes 38. The latter are connected to the conductors 18, 19, and 20. The segments are engaged by wiper brushes 42, 43, 44, and 45 angularly spaced and mounted on the free ends of spring arms 46 and 47. These arms of the different commutating switches are arranged in pairs respectively connected by conductors 48 and 49 to the terminals of a direct current source.

When the shaft 36 is disposed as shown in the drawing and positive and negative potential is applied to the conductors 19 and 20, the windings $c$ will be energized through the brushes 42 and 43 and the segment 32 while the opposite terminal of the current source will be connected to the windings $a$ through the brushes 44 and 45 and the segment 34, the conductor 18 being at zero potential. With the delta connections, the windings $a$ are placed directly across the line and the windings $b$ and $c$ are in series across the line and, therefore, the current therein is half that of the coils $a$. Accordingly, the flux densities in the different stator teeth will be in the ratios of 4 for the teeth 2 and 8, 3 for the teeth 1, 3, 7, and 9, and 2 for the teeth 4, 6, 10, and 12. The effects of the windings on the teeth 5 and 11 cancel each other so that these teeth are deenergized and the rotor poles are attracted by the other teeth to the well defined position shown.

Now assume that the switch shaft 36 is advanced thirty degrees clockwise, the contacts 44 and 45 respectively engage the segments 34 and 33 thereby connecting the conductors 18 and 20 to short out the coils $b$. The flux densities in the different stator teeth are then zero in teeth 4 and 10, 2 in teeth 3, 5, 9, and 11, and 4 in teeth 1, 2, 6, 7, 8, and 12. The rotor is thus attracted to a position one-twelfth of a revolution in advance of that shown in the drawing. In a similar manner, the energization ratios of the teeth will be varied in different combinations as the switch shaft is advanced in thirty degree steps and the rotor will follow.

The invention contemplates driving the shaft 36 of the commutator switch in either direction to produce a corresponding rotation of the step motor. This is accomplished by a reversible direct current motor 50 operable through reduction gearing 51 to drive the shaft at approximately 800 R. P. M. at which speed the step motor will readily follow the commutator switch shaft. To simplify the switching arrangement, the motor 50 is preferably of the type having a permanent magnet stator 52 so that the direction of rotation of its rotor may be reversed by changing the polarity at the winding terminals or brushes 53 of the rotor 54. These terminals are connected by conductors 55 and 56 to terminals 57 and cross-connected to terminals 58 of the switch 22 which is of the double throw type equipped with self-centering means (not shown) for its movable contacts 59. The latter are actuated manually and connected by conductors 60 to opposite terminals of a direct current source such as a battery 61.

In order that the step motor 24 will be energized and deenergized in unison with the motor 50, the conductors 48 and 49 are respectively connected to the conductors 55 and 56. Thus, by manually closing the contacts 59 against the switch terminals 57, the motor 50 will run in one direction and the resulting rotation of the commutator shaft 36 will cause energization of the windings in the proper combinations to produce similar rotation of the motor shaft 62 and the driven element 21. Reverse rotation of these parts takes place when the contacts 59 are reversed and in engagement with the terminals 58, it being immaterial that the connections to the commutator switch are also reversed.

When the switch 22 is moved to neutral position to deenergize the motor 50, the current supply to the commutator switch is also interrupted. As a result of such deenergization of the windings $a$, $b$, and $c$, the poles of the rotor 25 attract the nearest stator pole bringing the rotor and the driven element 21 to an abrupt stop, in spite of the fact that the motor 50 by which the commutator is driven continues to rotate and coast to a stop. In this way, the use of brakes or other devices depending on frictional action is avoided.

I claim as my invention:

A remote control comprising, in combination, a direct current electric step motor having a stator member and a coacting polar rotor member, one of said members having windings on the poles thereof and the other member being permanently magnetized and adapted, when said windings are deenergized, to attract the poles of the other member and cause said rotor member to stop abruptly in one of a plurality of well defined angular positions, a commutator switch having a rotary element and adapted to energize said windings selectively and cause progressive step-by-step turning of said rotor member during rotation of the element, a second direct current electric motor drivingly connected to said element, and switching means operable when closed to apply energizing direct current to said second motor and also to said first motor under the control of said commutator switch, said switching means, when opened, deenergizing the windings of both of said motors whereby said step motor stops abruptly in one of said positions during coasting of the second motor.

GEORGE FORREST DRAKE.